United States Patent Office 3,386,885
Patented June 4, 1968

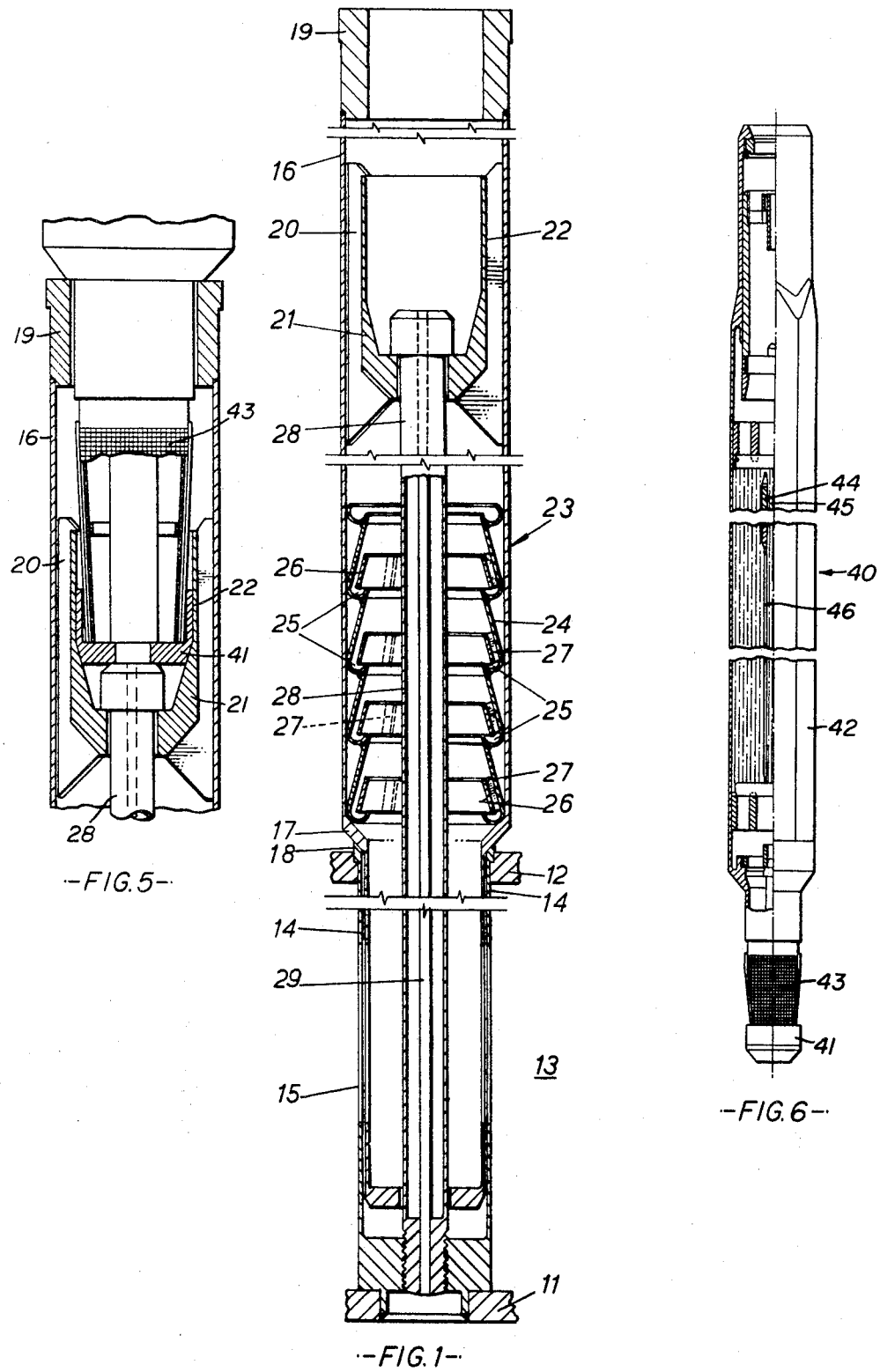

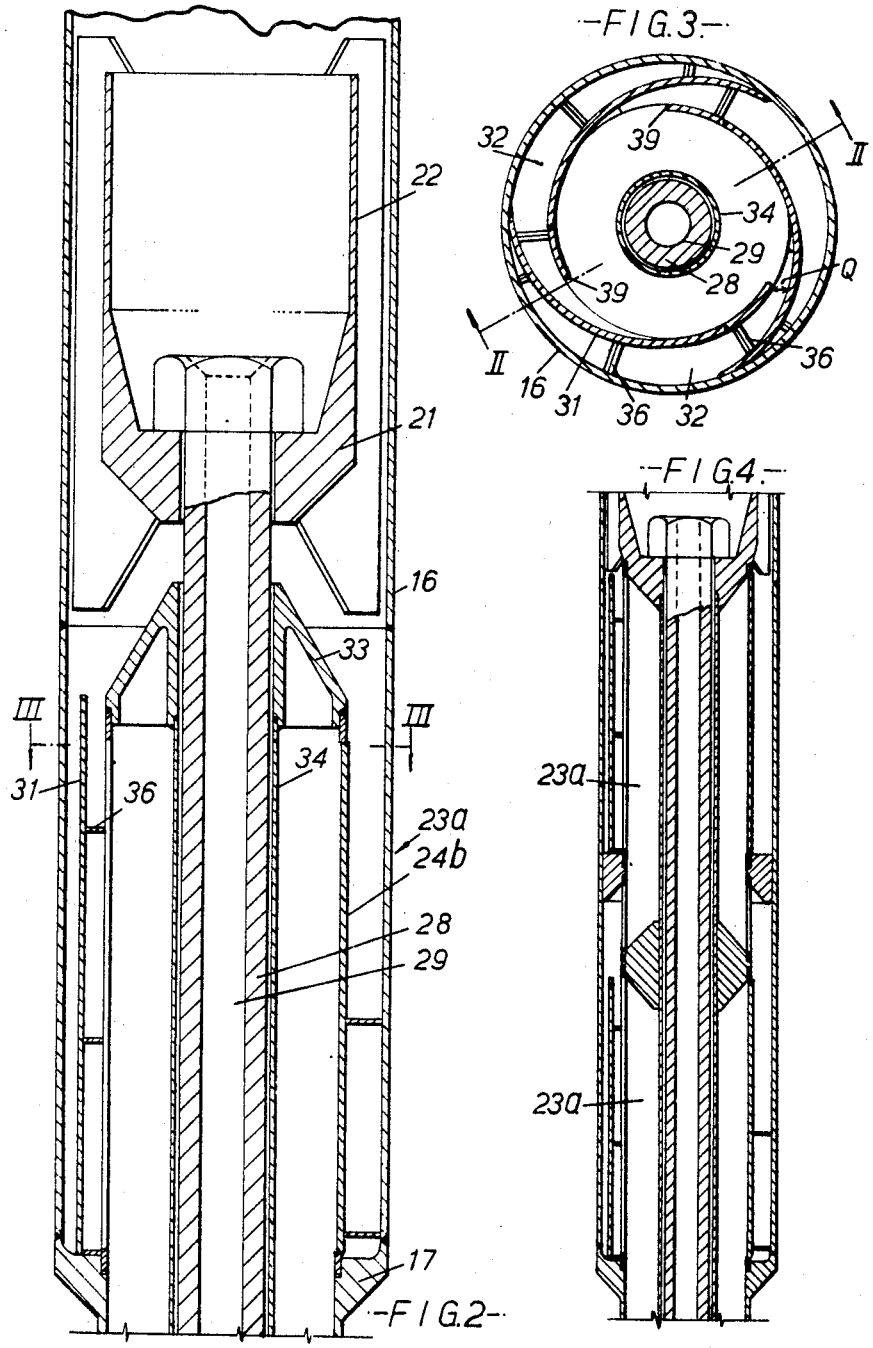

3,386,885
LIQUID-COOLED NUCLEAR REACTOR WITH COUNTERFLOW BRAKE DEVICE
James Rostron Wright, Appleton, Warrington, England, assignor to United Kingdom Atomic Energy Authority, London, England
Filed June 20, 1966, Ser. No. 558,974
Claims priority, application Great Britain, June 28, 1965, 27,283/65; Sept. 20, 1965, 40,078/65
4 Claims. (Cl. 176—37)

ABSTRACT OF THE DISCLOSURE

A core support structure of a liquid-cooled nuclear reactor has interposed in each of the passages by which the coolant passes from an inlet plenum to fuel-containing channels a hydraulic counterflow brake device arranged to resist reverse flow toward the inlet plenum so as to limit to a single channel the voiding of coolant which may occur because of the surge of released gas upon a sudden and large scale reservoir failure in fuel members of the type which have fission product gas reservoir spaces adjacent the inlet ends of the channels.

---

The present invetntion relates to nuclear reactors of the kind in which a core has channels opening at their inlet ends into a coolant inlet plenum for the passing of liquid coolant from the plenum over nuclear fuel in the channels.

The fuel in these channels may be rods formed by sealed pressure resistant sheathing containing fuel material. Furthermore this fuel material may be of a kind which releases fission product gases in the course being irradiated in the core. With material of this kind, a commonly proposed expedient is to leave voidage inside the sheathing which can act as a reservoir for the fission product gases and so reduce the rate of build up of internal pressure. Although a hollow form of the fuel material leaves suitable voidage, an adequate amount generally calls for the provision of reservoir space at one end of the rods. Rods with end reservoirs may be supported in the channels with their reservoir ends towards the inlet ends of the channels; indeed, such an arrangement is advantageous where the rods are to be supported in cantilever fashion at the inlet end of the core because the splay of the free ends resulting from bowing of the fuelled lengths of the rods is not unnecessarily magnified by the extra reservoir length.

Underlying the invention is the appreciation that if a sudden and large scale reservoir failure at the inlet end were to occur the resulting surge of released gas could blow back into the inlet plenum and so be distributed to adjacent channels with the consequence that more than one channel becames subject to voiding of coolant. In a fast reactor such voiding hardens the neutron flux spectrum with consequent reactivity gain and the more the channels affected the more this gain will be; it is far better in these circumstances that the coolant voiding is confined to one channel.

Accordingly, the invention provides a liquid cooled nuclear reactor core which is characterised by the following features: coolant channels of the core open at their inlet ends into a coolant inlet plenum; fuel over which coolant passes in the channels has fission product gas reservoir space adjacent the inlet ends of the channels; in respect of each fuel-containing channel there is interposed between the reservoir space and the inlet plenum a device which presents a considerably greater resistance to reverse flow than to the forward flow towards the outlet ends of the channels.

The reverse flow resisting devices have only to provide enough reverse flow resistance to ensure that the released gas bubble is complelled to go in the forward flow direction or at least does not reach the inlet plenum. The absolute prevention of reverse flow may not therefore be necessary and rather than employ non-return valves it may be preferred to rely on hydraulic counterflow brake devices which, without movable parts, impose against flow in the reverse direction a resistance which is many times greater than in the forward direction. If hydraulic counterflow brakes are used, then the avoidance of movable parts permits the location of the devices in question where serviceability is unimportant, as in the permanent structure of the reactor core. Accordingly, it is a feature of the invention that a core support structure of a liquid-cooled nuclear reactor has interposed in each of the communications by which the coolant passes from an inlet plenum to fuel-containing channels a hydraulic counterflow brake device arranged to resist reverse flow towards the inlet plenum.

The invention will be further described with reference to particular embodiments applicable to a sodium-cooled fast reactor core, three embodiments being illustrated, merely by way of example, in the accompanying drawings in which:

FIGURE 1 shows in longitudinal section one of a large number of sockets by which a core support structure locates fuel assemblies of the reactor core, FIGURE 2 is a fragmentary but otherwise similar view of another embodiment, this view being taken along line II—II of FIGURE 3, FIGURE 3 is a cross section along line III—III of FIGURE 2, and FIGURE 4 is a fragmentary longitudinal section of a further socket having two counter flow brake devices in series.

FIGURE 5 is a fragmentary longitudinal section similar to FIGURE 1 wherein the interfitting of a socket and a fuel assembly are shown, FIGURE 6 is a partially sectional longitudinal view drawn to a reduced scale of a fuel assembly.

As seen in FIGURE 1, the core support structure has lower and upper plates 11 and 12 defining between them an inlet plenum 13 to which coolant, such as sodium, is pumped for cooling the core. For further description of the support structure, the relationship of the structure with the reactor as a whole, and the nature of the assemblies which it supports, the reader is referred to commonly assigned copending application Ser. No. 55,405 of George Oliver Jackson, filed June 6, 1966. Tubes 14 joining together the plates 11 and 12 at each of the positions in the structure where an assembly is to be received have a symmetrical arrangement of four slotted apertures 15 for the entry of coolant from the inlet plenum 13. To form above the upper plate 12 a socket extension in which to receive an assembly (or possibly a plurality of assemblies), there is fixed in the tube 14 a second tube 16, which, below a shoulder 17 sealing on a conical lip 18 of the tube 14, is a sliding fit in the latter and has slotted apertures coinciding with the apertures 15. The second tube 16 terminates at its upper extremity with a bearing collar 19 (see FIGURE 5) and carried inside by a spider 20 is a cup 21 presenting a cylindrical bearing surface 22. As shown in FIGURE 5 cylindrical bearing surface 22 receives a bearing bush 41 located at the lower end of each fuel assembly 40 (see FIGURE 6). Bush 41 is fitted into the socket extension formed by the upstanding second tube 16 with the bearing surface of bush 41 engaging surface 22 of cup 21. In this way assembly 40 is provided with cantilever support.

Regarding the fuel assemblies 40, each assembly as is shown in FIGURE 6 has a tubular hexagonal casing 42, to the lower end of which is attached bearing bush 41.

A filter sleeve 43 of stainless steel gauze located above bush 41 serves to strain of solid particles the coolant which enters the assembly 40 in this region. Inside the casing 42 are fuel rods 44 arranged in parallel array on a triangular lattice. Each of the rods 44 has sealed pressure resistant metallic sheathing 45 in which a length denoted by reference numeral 46 amounting to nearly one half of the rod length is left void of fuel material to afford fission product gas reservoir space, such space being in all cases adjacent the aforementioned end fitting.

In the part of the tube 16 above the shoulder 17 there is embodied a hydraulic counterflow brake device 23 following the general principles of the valvular conduit described by Tesla in U.S. patent specification No. 1,329,559 dated Feb. 3, 1920. More specifically the device 23 has at least one annular component presenting a scoop face in the direction of forward flow: as illustrated a liner 24 is composed of a series of interconnected truncated conical sections and is thereby profiled to present, in axial sequence, a series of such faces shaped as annular scoops 25 directed away from the inlet plenum 13. This liner may be fabricated of metal sheet or may be cast, the former alternative being the one illustrated. Associated respectively with the scoops 25 are baffle plates 26 of a truncated conical form which are disposed edge on to the scoops so as to tend to divert reverse flow into the scoops. Each of these baffle plates 26 is supported by means of three plates 27 arranged symmetrically in planes including the axis of the liner.

It will be appreciated that the device 23 offers little resistance to the forward flow of coolant from the inlet plenum 13 through the apertures 15 and the tubes 14 and 16 to the channel represented by the tubular hexagonal casing 42 of the assembly 40 fitted into the socket extension of the tube 16. In the event however that a reverse flow tendency occurs due to a sudden expulsion of fission product gas from the nearby reservoir space 46 in the assembly 40, the coolant in the device 23 will be deflected into a whirling motion and the resistance opposing the reversal of flow will be considerable. Such resistance should be ample to ensure that any "blow-back" of gas does not reach the inlet plenum.

To assist the baffle plates 26 in deflecting reverse flow into the scoops 25 it may be arranged that jets directed radially towards these scoops is produced by such flow. For this purpose, a hollow column in the form of a tubular bolt 28, by which the second tube 16 is held in the tube 14, may have rings of jetting orifices at the levels of the baffle plates 26 and a reverse flow inlet somewhere between the cup 21 and the counterflow brake device 23. The coolant bleed path from the cup 21 to the underside of the support structure lower plate 11 for the purpose of "hydraulic hold-down" of the assembly is conducted through a fine bore pipe 29 in the hollow bolt 28 and therefore the radial jetting arrangement can be readily accommodated.

In FIGURES 2 and 3 the device 23a takes the form of a liner 24b comprising a number, say three, of vanes 31 which spiral out radially from a notional cylindrical extension of the inside wall of the tube 16 below the shoulder to define between them volute chambers 32. These vanes are secured to the wall of the tube 16 and to a flow baffle 33 carried from a further tube 34 which surrounds the bolt 28. This further tube 34 and the flow baffle 33 seal the downstream end of the cylindrical extension so that normal flow is directed from the extension into the volute chambers 32 wherein they have a circumferential motion.

The volute chambers 32 contain further guide vanes 36 whose function is to convert the circumferential motion into axial motion in the same direction as before.

It will be appreciated that the circumferential motion will commence upstream of where the flow enters the volute chambers and centrifugal effects will assist the flow into the volute chambers but with reverse flow the flow-producing pressure has to overcome this effect. It will be appreciated that the invention comprehends all throughflow counterflow brakes employing this principle irrespective of the number of vortex chambers be it one or many.

Any counterflow brake device will introduce some flow impedance into the circuit and it is desired to compromise between low forward flow impedance and high reverse flow impedance. To obtain the optimum in various cases, it is necessary to vary the distance Q which is the minimum distance or throat between two adjacent vanes. A good compromise is given if the velocity through the throat is fifty per cent more than the velocity upstream and downstream of the brake device.

One method of fabricating the brake device is to use an axially slotted tube to define the leading, that is, upstream in normal forward flow, edges 39 of the vanes and to weld the vanes to those edges of the slots that do not define leading edges. By varying the width of the axial slots, the width of the throat can be adjusted to that desired.

An improvement in the performance can sometimes be obtained by having the leading edges 39 set radially outwardly from the notional cylinder or by restricting the upstream axial flow to less than the notional cylinder cross section by means of a baffle. By these means there is provided a radial depth in which reverse flow takes the form of a close pitch spiral whirl without an axial component of motion.

Another way of optimising performance is to use a number of brake devices 23a in series as shown in FIGURE 4. The axial flow leaving one brake device 23a outside of said notional cylindrical extension re-enters the notional cylindrical extension on entry to a subsequent brake device.

There are of course further forms of reverse flow restraining means usable within the scope of the invention, for example, adaptations of the brake described by Thoma in U.S. patent specification No. 1,839,616.

What I claim is:

1. In a liquid-cooled nuclear reactor core, the combination comprising a coolant inlet plenum, coolant channels have inlet ends separately in communication with the inlet plenum, nuclear fuel material contained in sealed pressure resistant sheathing, such sheathed fuel material being disposed in said channels and the sheathing having non-vented fission product gas reservoir space adjacent the inlet ends of said channels, and interposed in each fuel containing channel between the reservoir space and the inlet plenum a hydraulic counterflow brake device which presents a considerably greater resistance to reverse flow in the direction towards said plenum than to the normal forward flow from said plenum to the channel.

2. A core support structure for a liquid-cooled nuclear reactor, said structure comprising an inlet plenum, a plurality of tubular means fixedly in communication with said plenum and each defining at least one socket for reception of one end of a casing of a reactor fuel assembly, the wall of which casing defines a channel for coolant flow therein, a hydraulic counter-flow brake device in said tubular means and having a greater resistance to reverse flow in the direction towards said plenum than to the normal forward flow from the plenum to the fuel assembly, a column included internally in each tubular means for forming an annular flow space within said tubular means, and at least one annular component of said hydraulic counter-flow brake device occupying a portion of the radial width of said annular flow space and presenting a scoop profile to said reverse flow.

3. A core support structure according to claim 2, wherein a series of said components are formed by a liner in said tubular means, said liner comprising a series of similar truncated conical wall sections all convergent in the direction of said forward flow, interconnections presenting the scoop face between each pair of adjacent sections, and truncated conical baffle plates spaced at intervals to lie respectively edge on to the scoop face interconnections and substantially parallel with the adjacent conical wall sections.

4. A core support structure for a liquid-cooled nuclear reactor, said structure comprising an inlet plenum, a plurality of tubular means fixedly in communication with said plenum and each defining at least one socket for reception of one end of a casing of a reactor fuel assembly, the wall of which casing defines a channel for coolant flow therein, a hydraulic counterflow brake device in said tubular means and having a greater resistance to reverse flow in the direction towards said plenum than to the normal forward flow from the plenum to the fuel assembly, a column forming within said tubular means an annular flow space, radially spiralling vanes of said hydraulic counterflow brake device occupying an outer portion of said annular flow space, and means constraining said forward flow to entry into the vaned portion of the annular space from the unvaned portion and to exit from one end of the vaned portion.

References Cited
UNITED STATES PATENTS

| | | | |
|---|---|---|---|
| 1,329,559 | 2/1920 | Tesla | 138—37 |
| 1,839,616 | 1/1932 | Thoma | 138—37 |
| 2,926,127 | 2/1960 | McCorkle | 176—64 |
| 3,010,889 | 11/1961 | Fortescue et al. | 176—37 |
| 3,196,083 | 7/1965 | Hosegood et al. | 176—37 |
| 3,238,105 | 3/1966 | McNelly | 176—37 |
| 3,240,678 | 3/1966 | Hemmerle et al. | 176—64 |

FOREIGN PATENTS 647,974  9/1962  Canada.

REUBEN EPSTEIN, *Primary Examiner.*